L. D. REED.
AUTOMOBILE CHASSIS AND YIELDABLE AND SHOCK ABSORBING BEARING FOR AXLES.
APPLICATION FILED APR. 7, 1919.
1,314,982. Patented Sept. 2, 1919.
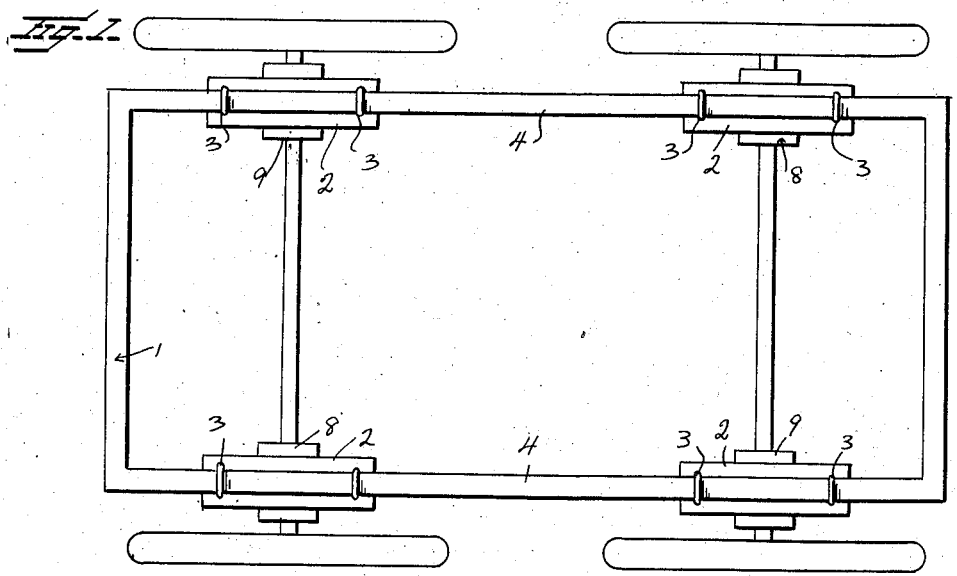
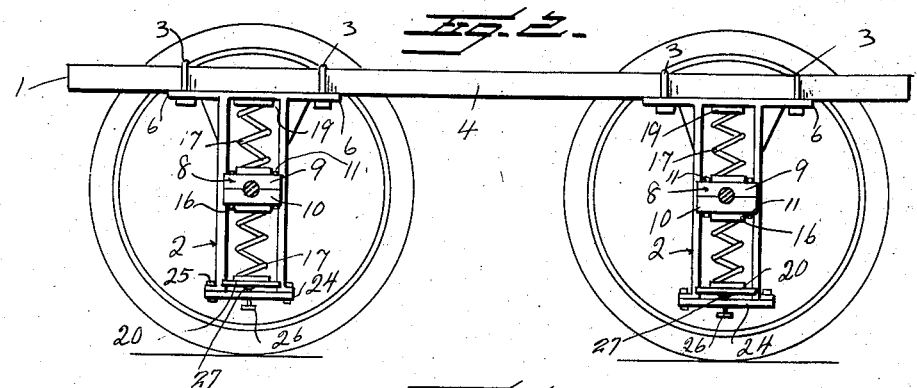
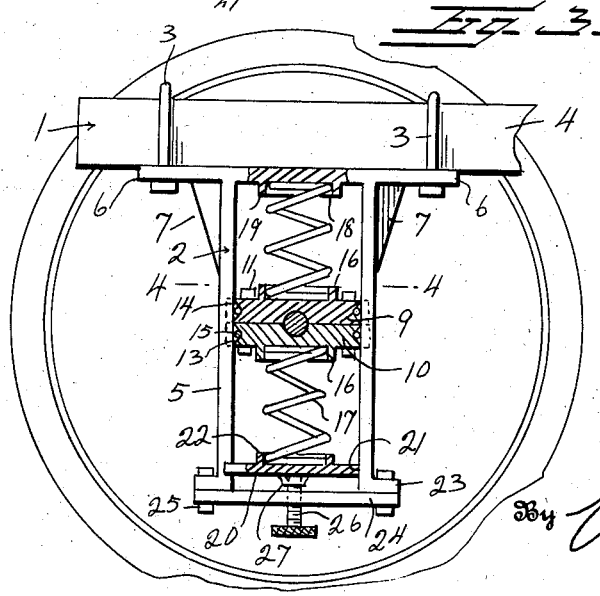
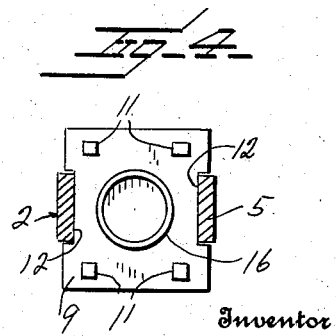
Inventor
L. D. Reed
By Watson E. Coleman
Attorney

UNITED STATES PATENT OFFICE.

LUKE DANIEL REED, OF BURNHAM, ILLINOIS.

AUTOMOBILE-CHASSIS AND YIELDABLE AND SHOCK-ABSORBING BEARING FOR AXLES.

1,314,982.     Specification of Letters Patent.     Patented Sept. 2, 1919.

Application filed April 7, 1919. Serial No. 288,140.

*To all whom it may concern:*

Be it known that I, LUKE D. REED, a citizen of the United States, residing at Burnham, in the county of Cook and State of Illinois, have invented certain new and useful Improvements in Automobile-Chassis and Yieldable and Shock-Absorbing Bearings for Axles, of which the following is a specification, reference being had to the accompanying drawings.

This invention relates to yieldable shock absorbing bearings for the axles of an automobile, whereby the chassis is supported yieldably, and whereby the shocks due to the contact of the wheels with an uneven roadbed are absorbed.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a plan view of an automobile chassis or frame, showing the supporting wheels.

Fig. 2 is a view in side elevation of the same.

Fig. 3 is a detail view in side elevation of a portion of the chassis or frame, showing one of the wheels, and the axle bearings and the yieldable means on enlarged scales.

Fig. 4 is a sectional view on line 4—4 of Fig. 3.

Referring more especially to the drawings 1 designates an automobile chassis or frame, which may be any suitable shape or construction, preferably of conventional form, for instance the sides and ends thereof being in the form of I-beams in cross-section.

Depending from this chassis or frame, at suitable locations for the mounting of front and rear axles are bearing or guide frames 2. These bearing or guide frames may be bolted, riveted or otherwise secured as at 3 to the sides 4 of the chassis or frame. Each guide or bearing frame comprises the depending parts or arms 5. Where the depending parts or arms 5 extend from the top of the bearing or guide frame 2 the outer surfaces of said arms or depending parts curve into the ears or lugs 6, which receive the fastening or securing bolts 3, so that the depending guide or bearing frame may be secured to the chassis or automobile frame. It is obvious that where these outer surfaces merge into the ears or lugs 6, the depending parts or arms are braced, since there are webs or ribs 7 formed between the arms or depending parts 5 and the ears or lugs 6. Axle bearings 8 are provided. Each axle bearing 8 comprises the upper and lower members 9 and 10, which are secured together by the bolts 11. The end edges of the upper and lower members 9 and 10 are provided with notches 12, which receive the adjacent portions of the depending arms 5, whereby the axle bearing is capable of being guided vertically. The bottoms of the notches of the end edges of the upper and lower members 9 and 10 have recesses 13, which, since the upper and lower members are secured together by the bolts, form pockets 14, for the reception of anti-frictional bearings 15, thereby permitting the axle bearing to freely move vertically. It is to be observed that the upper and lower faces of the members 9 and 10 of the axle bearing have annular flanges 16, which surround or are engaged by the adjacent ends of the upper and lower springs 17, thereby acting to retain the adjacent ends of the springs in engagement with the axle bearing. The underface 18 of the crotch between the depending arms or parts 5 is provided with an annular flange 19, within which the upper end of the upper spring 17 engages, to retain the spring in position. A plate 20 is disposed between the lower ends of the depending arms 5, and the end edges of this plate are provided with notches 21, for the reception of the adjacent parts of the depending arms 5, thereby acting to guide the plate 20, when adjusted vertically. The upper face of the plate 20 also has an annular flange 22, within which the lower end of the lower spring 17 engages, to retain the lower spring in position and axially with relation to the upper spring. The lower ends of the depending arms 5 have lateral lugs 23, to which a main supporting and bracing plate 24 is secured by bolts 25. A set screw 26 is threaded through the supporting and bracing plate 24, and the end of said set screw has an enlargement 27, which engages the underface of the plate 20, thereby supporting the plate 20. It is obvious that by adjusting the set screw 26, the auxiliary supporting plate 20 may be adjusted vertically between the depending guide arms 5. In adjusting the plate 20, it is obvious that the tension of the lower spring 17 may be regulated, and owing to the regulation of the lower spring, the upper spring will be regulated, since it is obvious that when adjusting the set screw 26, the plate 20 will be moved upwardly. It is obvious that by this construction the body of the automobile and also the chassis is yieldably mounted on the axles, and the axles are in turn yieldably mounted in the axle bearing frames. Such a construction will permit easier riding, and owing to the shocks due to the contacting of the wheels with an uneven roadbed, being absorbed by the springs, smoother riding will be assured.

The invention having been set forth, what is claimed as new and useful is:

1. The combination with an automobile chassis, of an axle bearing frame comprising parallel vertically depending arms carried by the chassis, an axle bearing having guide notches at its ends to engage the arms of the axle bearing frame, whereby the axle bearing may be guided vertically, the bottoms of the notches having anti-frictional means to engage the adjacent faces of the arms, supporting and bracing means connecting the lower ends of the arms, a plate having means at its ends to engage the arms whereby the plate is guided, a spring between the upper part of the axle bearing and the upper wall of the axle bearing frame, a spring between the lower face of the axle bearing and the plate, means for retaining the ends of the springs in place, and means carried by the supporting and bracing means at the lower ends of the arms, to adjust the plate, whereby the tension of the springs may be regulated.

2. The combination with an automobile chassis, of an axle bearing frame carried by the chassis and comprising parallel vertical depending arms, means detachably connecting the lower ends of said arms, an axle bearing having guide notches at its ends engaging the arms of the axle bearing frame, whereby the axle bearing may be guided vertically, a plate having guide notches at its ends engaging the arms whereby the plate is guided vertically, a spring between the upper part of the axle bearing and the upper wall of the axle bearing frame, a spring between the lower face of the axle bearing and the plate, means for retaining the ends of the springs in place, and an adjustable screw carried by the connecting means of the lower ends of the arms, and being swiveled to the plate, for adjusting the plate, whereby the tension of the springs may be regulated.

In testimony whereof I hereunto affix my signature in the presence of two witnesses.

LUKE DANIEL REED.

Witnesses:
F. C. CRUMPACKER,
MOLLIE KRIEGER.